United States Patent
Yoo

(10) Patent No.: US 10,672,129 B1
(45) Date of Patent: Jun. 2, 2020

(54) METHOD FOR SEMANTIC SEGMENTATION AND APPARATUS THEREOF

(71) Applicant: Lunit Inc., Seoul (KR)

(72) Inventor: In Wan Yoo, Seoul (KR)

(73) Assignee: LUNIT INC., Seoul (KR)

( * ) Notice: Subject to any disclaimer, the term of this patent is extended or adjusted under 35 U.S.C. 154(b) by 0 days.

(21) Appl. No.: 16/664,468

(22) Filed: Oct. 25, 2019

(30) Foreign Application Priority Data

Mar. 22, 2019 (KR) .................... 10-2019-0032699

(51) Int. Cl.
| | |
|---|---|
| *G06T 7/13* | (2017.01) |
| *G06K 9/72* | (2006.01) |
| *G06K 9/62* | (2006.01) |
| *G06N 3/08* | (2006.01) |
| *G06N 3/04* | (2006.01) |

(52) U.S. Cl.
CPC .............. *G06T 7/13* (2017.01); *G06K 9/6262* (2013.01); *G06K 9/726* (2013.01); *G06N 3/0454* (2013.01); *G06N 3/084* (2013.01); *G06T 2207/20081* (2013.01); *G06T 2207/20084* (2013.01)

(58) Field of Classification Search
CPC ........ G06K 9/726; G06K 9/6262; G06T 7/13; G06T 2207/20081; G06T 2207/20084
USPC .......................................... 382/157, 173, 199
See application file for complete search history.

(56) References Cited

U.S. PATENT DOCUMENTS

| | | | |
|---|---|---|---|
| 10,410,353 B2* | 9/2019 | Feng | G06N 3/04 |
| 10,482,603 B1* | 11/2019 | Fu | G06T 7/0012 |
| 10,551,845 B1* | 2/2020 | Kim | G05D 1/0221 |
| 2019/0057507 A1 | 2/2019 | El-Khamy et al. | |

FOREIGN PATENT DOCUMENTS

| | | |
|---|---|---|
| JP | 2018-195293 | 12/2018 |
| KR | 10-2018-0097944 | 9/2018 |
| KR | 10-2019-0007468 | 1/2019 |
| KR | 10-2019-0019822 | 2/2019 |
| KR | 10-2019-0021095 | 3/2019 |
| KR | 10-2019-0024400 | 3/2019 |
| WO | 2017-201444 | 11/2017 |

OTHER PUBLICATIONS

Heewon Chung, "Attention-based image classification using semantic segmentation and convolutional neural network", MS Thesis, KAIST, 2017.

* cited by examiner

*Primary Examiner* — Daniel G Mariam
(74) *Attorney, Agent, or Firm* — Lex IP Meister, PLLC

(57) ABSTRACT

A semantic segmentation method and apparatus for improving an accuracy of a segmentation result are provided. The semantic segmentation method inputs a labeled image into a segmentation neural network to obtain segmentation information for the image, and back-propagates a segmentation loss for the segmentation information to update the segmentation neural network. The segmentation neural network is updated by further back-propagating an edge loss for the segmentation information.

17 Claims, 10 Drawing Sheets

METHOD FOR SEMANTIC SEGMENTATION AND APPARATUS THEREOF

CROSS-REFERENCES TO THE RELATED APPLICATIONS

This application claims priority from Korean Patent Application No. 10-2019-0032699 filed on Mar. 22, 2019, in the Korean Intellectual Property Office, the disclosure of which is incorporated herein by reference in its entirety.

BACKGROUND

(a) Field

The present disclosure relates to a method and apparatus for semantic segmentation. In particular, the present disclosure relates to a method for improving an accuracy of a segmentation result when performing semantic segmentation using a neural network, and an apparatus for supporting the method.

(b) Description of the Related Art

In machine learning, semantic segmentation refers to a task of classifying all pixels of an image into predefined classes of semantic objects. Since the semantic segmentation performs pixel-wise prediction, it is sometimes referred to as dense prediction. Typically, the semantic segmentation is performed on a deep neural network, which requires a substantial amount of images and a fine label (e.g., pixel-wise class information) containing class, location, and shape information of the semantic object.

However, due to the human cost of labeling, it is very difficult to obtain an image set given fine labels. For example, in a medical domain, since labeling is performed by specialists, even a simple labeling operation is expensive. Thus, it is impossible to obtain a large number of medical images which are finely labeled up to edges (i.e., shapes) of semantic objects (e.g., lesions).

In order to solve the above problem, it may be considered to perform semantic segmentation using coarse labels. However, when the deep neural network is learned by using the coarse labels, the accuracy of the segmentation result cannot be guaranteed. For example, when the deep neural network is learned by using labels that include no edge information of semantic objects, the shapes of the semantic objects shown in the segmentation results do not follow the original shapes.

SUMMARY

Some embodiments of the present disclosure provide a semantic segmentation method that can improve the accuracy of the segmentation result, and an apparatus supporting the method.

Some embodiments of the present disclosure provide a method of learning a segmentation neural network to accurately predict a shape of a semantic object using a label including no edge information of the semantic object, and an apparatus supporting the method.

Some embodiments of the present disclosure provide a method that can improve the performance of the segmentation neural network by accurately calculating an edge loss for the semantic object, and an apparatus for supporting the method According to some embodiments of the present disclosure, semantic segmentation method performed by a computing device is provided. The semantic segmentation method may include inputting a labeled image into a segmentation neural network to obtain segmentation information for the image, calculating a segmentation loss and an edge loss for the segmentation information, and back-propagating the segmentation loss and the edge loss to update the segmentation neural network.

In some embodiments, the label may include no edge information indicating a shape of a semantic object.

In some embodiments, the segmentation loss may be calculated based on a cross-entropy loss function, and the edge loss may be calculated based on an L1 loss function or an L2 loss function.

In some embodiments, calculating the edge loss may include obtaining first edge information of the semantic object in the image through an edge detection neural network, extracting second edge information from the segmentation information using image processing logic, and calculating the edge loss based on the first edge information and the second edge information. In this case, the edge detection neural network may be updated through backpropagation of the edge loss.

In some embodiments, the edge detection neural network may include fewer layers or weight parameters than the segmentation neural network.

In some embodiments, calculating the edge loss based on the first edge information and the second edge information may include inputting the image into an attention neural network to obtain attention information of the image, obtaining third edge information by applying the attention information to the first edge information, and calculating the edge loss based on a difference between the second edge information and the third edge information. In this case, the attention neural network may be updated through backpropagation of the edge loss.

According to some embodiments of the present disclosure, a semantic segmentation apparatus including a memory that stores one or more instructions and a processor is provided. The processor, by executing the stored one or more instructions, may input a labeled image into a segmentation neural network to obtain segmentation information for the image, calculate a segmentation loss and an edge loss for the segmentation information, and back-propagate the segmentation loss and the edge loss to update the segmentation neural network.

In some embodiments, the processor may obtain first edge information of the semantic object in the image through an edge detection neural network, extract second edge information from the segmentation information using image processing logic, and calculate the edge loss based on the first edge information and the second edge information. In this case, the edge detection neural network may be updated through back propagation of the edge loss.

In some embodiments, the processor may input the image into an attention neural network to obtain attention information of the image, obtain third edge information by applying the attention information to the first edge information, and calculate the edge loss based on a difference between the second edge information and the third edge information. In this case, the attention neural network may be updated through backpropagation of the calculated edge loss.

According to some embodiments of the present disclosure, a computer program stored in a non-transitory computer-readable recording medium is provided. The computer program may cause a computing device to execute inputting a labeled image into a segmentation neural network to obtain segmentation information for the image, calculating a segmentation loss and an edge loss for the segmentation information, and back-propagating the segmentation loss and the edge loss to update the segmentation neural network.

In some embodiments, the label may include no edge information indicating a shape of a semantic object.

In some embodiments, the segmentation loss may be calculated based on a cross-entropy loss function, and the edge loss may be calculated based on an L1 loss function or an L2 loss function.

In some embodiments, calculating the edge loss may include obtaining first edge information of the semantic object in the image through an edge detection neural network, extracting second edge information from the segmentation information using image processing logic, and calculating the edge loss based on the first edge information and the second edge information. In this case, the edge detection neural network may be updated through backpropagation of the edge loss.

DETAILED DESCRIPTION OF THE EMBODIMENTS

Figure 1:
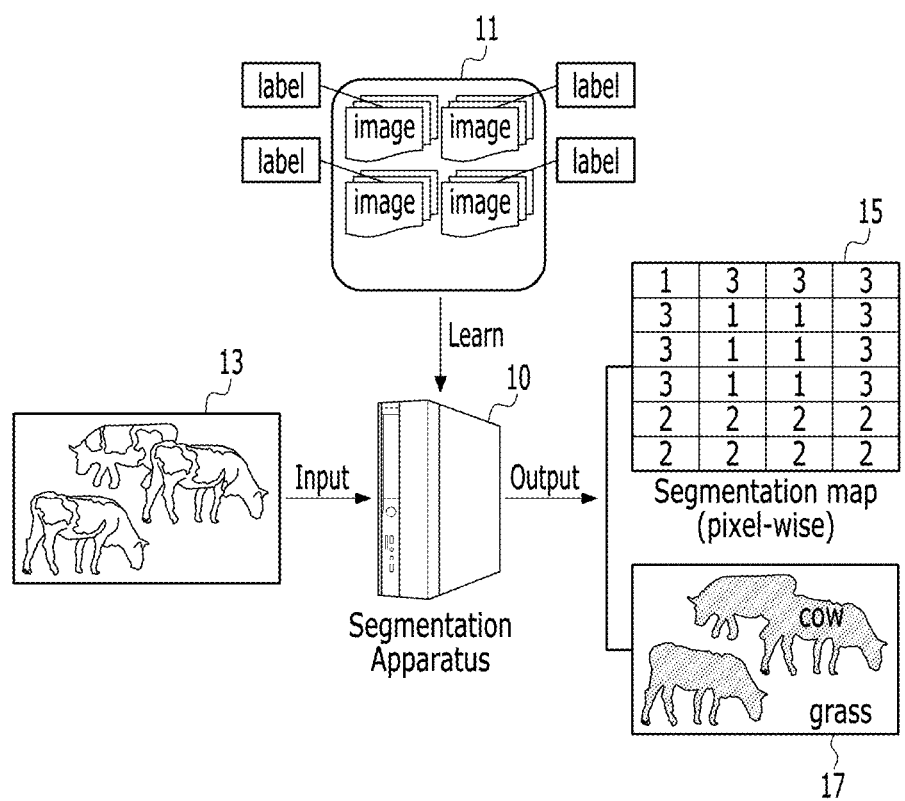
FIG. 1 is an example diagram showing a semantic segmentation apparatus 10 and a learning environment according to some embodiments of the present disclosure.

Hereinafter, embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to the person of ordinary skill in the art, and the present disclosure will only be defined by the appended claims. Like reference numerals designate like elements throughout the specification.

Unless otherwise defined, all terms (including technical and scientific terms) used herein have the same meaning as commonly understood by the person of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms "a", "an" and "the" are intended to include the plural forms as well, unless the context clearly indicates otherwise.

It will be further understood that, although the terms first, second, A, B, (a), (b), and the like may be used herein to describe various elements, components, steps and/or operations. These terms are only used to distinguish one element, component, step or operation from another element, component, step or operation. Thus, a first element component, step or operation discussed below could be termed a second element, component, step or operation without departing from the teachings of the present inventive concept. It will be further understood that when an element is referred to as being "connected to" or "coupled with" another element, it can be directly connected or coupled with the other element or intervening elements may be present.

It will be further understood that the terms "comprise" or "comprising", "include" or "including", and "have" or "having" specify the presence of stated elements, steps, operations, and/or devices, but do not preclude the presence or addition of one or more other elements, steps, operations, and/or devices.

Before description, some terms used herein will be clarified.

As used herein, the term "semantic object" may mean an object that is a target of semantic segmentation. A class of the semantic object may be defined in advance, and a background may also be defined as one semantic object.

As used herein, the term "fine label" may mean a label having a relatively high accuracy or precision compared to a coarse label. For example, the fine label may be a label (e.g. pixel-wise class information) including class, location, and shape information about a semantic object.

Figure 2:
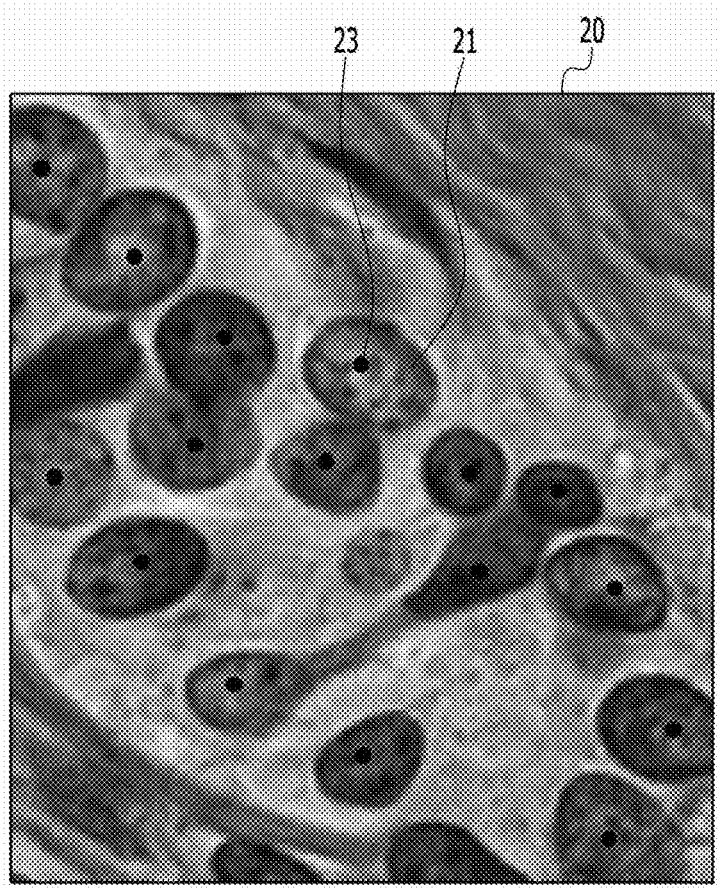
FIG. 2 and FIG. 3 show examples of coarse labels to be referred in various embodiments of the present disclosure.
Figure 3:
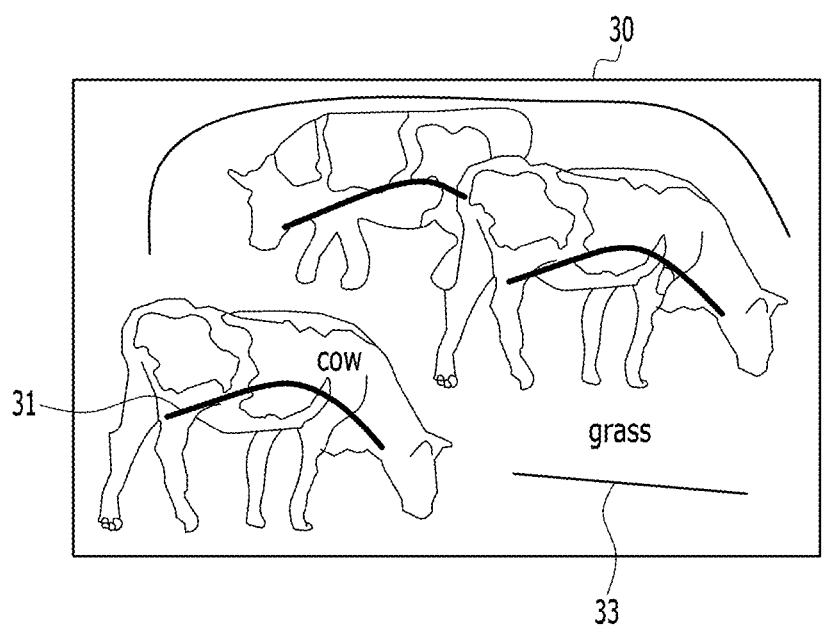

As used herein, the term "coarse label" may mean a label having a relatively low accuracy or precision compared to a fine label. For example, the fine label may include edge information indicating a shape of a semantic object, and the coarse label may not include the edge information or may include only rough information (e.g., scribble information) about the shape of the semantic object. An example of the coarse label is shown in FIG. 2 and FIG. 3.

As used herein, the term "segmentation neural network" may mean a neural network used for semantic segmentation. Since the segmentation neural network may be implemented as a neural network having various forms or structures, the technical scope of the present disclosure is not limited by the implementation manner of the segmentation neural network.

As used herein, the term "edge detection neural network" may mean a neural network used to detect an edge in an image. Since the edge detection neural network may be implemented as a neural network having various forms or structures, the technical scope of the present disclosure is not limited by the implementation manner of the edge detection neural network. Further, in the art, the term "edge" may be used interchangeably with various terms such as outline, contour, boundary, and the like.

As used herein, the term "instruction" refers to a series of computer-readable commands which are bound based on functionality. The instruction is an element of a computer program and executed by a processor.

Hereinafter, various embodiments of the present disclosure will be described in detail with reference to the accompanying drawings.

FIG. 1 is an example diagram showing a semantic segmentation apparatus 10 and a learning environment according to some embodiments of the present disclosure.

As shown in FIG. 1, a semantic segmentation apparatus 10 is a computing device that performs semantic segmentation on an image. More specifically, the semantic segmentation apparatus 10 may learn a segmentation neural network using a labeled image set 11. Further, the semantic segmentation apparatus 10 may perform the semantic segmentation on an unlabeled image 13 using the learned segmentation neural network. As a result, the semantic segmentation apparatus 10 may output segmentation information (e.g. 15, 17) of the image. In this case, the segmentation information may include a segmentation map 15 or segmented image 17 including pixel-wise class information, but is not limited thereto. Hereinafter, for convenience of description, the semantic segmentation apparatus 10 is referred to as a "segmentation apparatus" 10.

Figure 10:
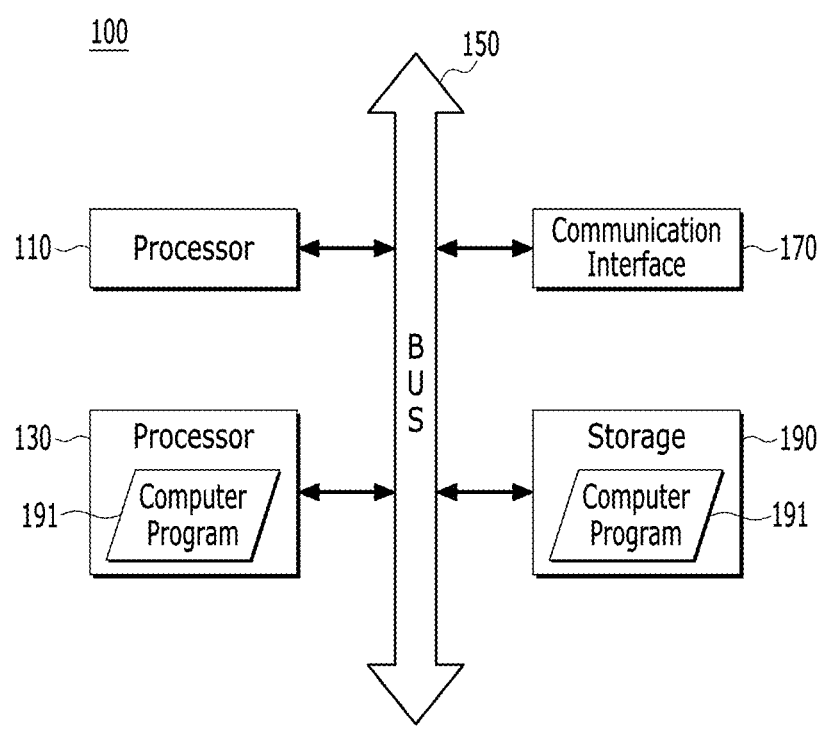
FIG. 10 is a diagram showing an example computing device for implementing an apparatus according to various embodiments of the present disclosure.

The computing device may be a tablet, a desktop, a laptop, a server, or the like. However, the computing device is not limited thereto and may include any kind of device having a computing function. An example of the computing device is shown in FIG. 10.

Although FIG. 1 shows that the segmentation apparatus 10 is implemented as one computing device by way of example, a first function of the segmentation apparatus 10 may be implemented by a first computing device, and a second function of the segmentation apparatus 10 may be implemented by a second computing device. In other words, the segmentation apparatus 10 may be composed of a plurality of computing devices, and the plurality of computing devices may separately implement first and second functions.

The image set 11 is a training data set including a plurality of images. Each image may be given a label for the semantic object, and the segmentation neural network may be learned by using the given label.

In various embodiments of the present disclosure, the labels of the image set 11 may include a coarse label.

In some embodiments, the coarse label may not include edge information of the semantic object, and may include class and location information of the semantic object. For example, the coarse label may include marking information indicating a class of the semantic object and a position of the semantic object. An example is shown in FIG. 2. As shown in FIG. 2, the coarse label may include information in which a position of a cell 21 on an image 20 is marked in the form of a point 23, and may not include edge information of the cell 21.

In some embodiments, the coarse label may include class and location information of the semantic object and schematic shape information of the semantic object. For example, the coarse label may include scribble information indicating a schematic shape of the semantic object instead of the edge information. An example is shown in FIG. 3. As shown in FIG. 3, the coarse label may include scribble information 31 and 33 of semantic objects (e.g. cow and grass) included an image 30 instead of edge information of the semantic objects.

In some embodiments, the coarse label may include bounding box information indicating the semantic object. In addition, since there may be various types of coarse labels, the technical scope of the present disclosure is not limited to a specific type of the coarse label.

According to various embodiments of the present disclosure, the segmentation apparatus 10 may learn the segmentation neural network by learning an edge loss for the semantic object in addition to a segmentation loss. As a result, even if the coarse label is given, the segmentation neural network can be learned to accurately predict the shape of the semantic object. According to the present embodiment, even if the coarse label is given, a fine segmentation result can be provided. In addition, since a semantic segmentation task can be performed without using the fine label, a labeling cost can be greatly reduced.

The segmentation apparatus 10 and learning environment according to some embodiments of the present disclosure have been described with reference to FIG. 1 to FIG. 3. Hereinafter, a semantic segmentation method according to some embodiments of the present disclosure is described with reference to FIG. 4 to FIG. 9.

Each step of a method to be described below may be performed by a computing device. In other words, each step of the method may be implemented as one or more instructions which are executed by a processor of the computing device. Although all steps included in the method may be executed by one physical computing device, they may be distributed and executed on a plurality of computing devices. For example, first steps of the method may be performed by a first computing device, and second steps of the method may be performed by a second computing device. Assuming that each step of the method is performed by the segmentation apparatus 10 exemplified in FIG. 1, the method is described below. Therefore, when a subject of a specific operation is omitted in the following description, the corresponding operation may be considered to be performed by the exemplified learning apparatus 10. Further, in the method according to the present embodiment, an execution sequence of operations may be changed as necessary as long as the sequence is logically changed.

Figure 4:
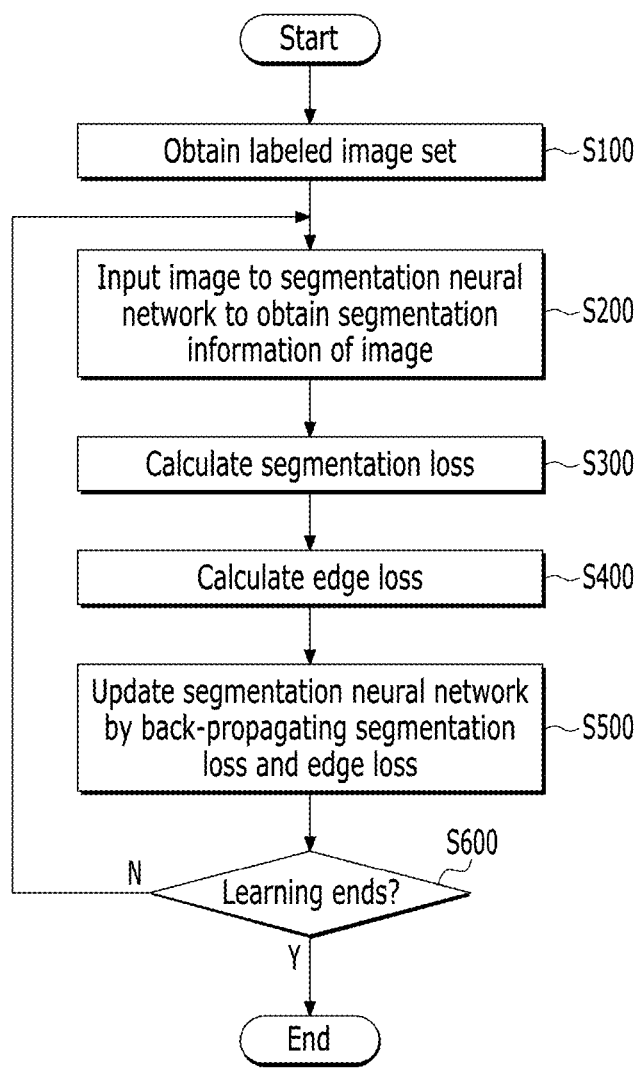
FIG. 4 is an example flowchart schematically showing a learning process of a semantic segmentation method according to some embodiments of the present disclosure.

FIG. 4 is an example flowchart showing a learning process of a semantic segmentation method according to some embodiments of the present disclosure. However, the flowchart shown in FIG. 4 merely corresponds to an exemplary embodiment for achieving an object of the present disclosure, and some steps may be added or omitted as necessary.

As shown in FIG. 4, the semantic segmentation method begins with step S100 of obtaining a labeled image set. The image set includes a plurality of images, and the following steps S200 to S500 may be performed for each image or for each mini batch. Hereinafter, the description is continued assuming that the learning is performed for each image, but the technical scope of the present disclosure is not limited thereto.

In some embodiments, the labels may include a coarse label. That is, the image set may include one or more images given the coarse label. Further, the coarse label may not include edge information of a semantic object, and may include location information or schematic shape information of the semantic object. Examples of the coarse label are shown in FIG. 2 and FIG. 3.

In step S200, the image is input to a segmentation neural network. The segmentation neural network refers to a main neural network that performs semantic segmentation which is a target task. As a result of the input, segmentation information of the image is output from the segmentation neural network. The segmentation information may include, for example, a segmentation map including pixel-wise class information of the semantic object, or information obtained by processing the segmentation map in an image form. However, the segmentation information is not limited thereto.

In step S300, a segmentation loss of the obtained segmentation information is calculated. The segmentation loss may be calculated based on a difference between the segmentation information and label information given in the image (see FIG. 5 to FIG. 8). A specific method of calculating the segmentation loss may vary depending on embodiments.

In some embodiments, the segmentation loss may be calculated based on a cross-entropy loss function. For example, a difference between a prediction class of the semantic object included in the segmentation information and a true class included in the label may be calculated by the cross-entropy loss function. Further, the difference may be calculated for each pixel.

In step S400, an edge loss of the segmentation information is calculated. The edge loss is a value for emphasizing an error in a shape aspect of the semantic object, and may be understood as a value used to enable the segmentation neural network to accurately predict the shape of the semantic object. A specific method of calculating the edge loss may vary depending on embodiments. The method of calculating the edge loss will be described in detail with reference to FIG. 5 to FIG. 8.

In step S500, weights of the segmentation neural network are updated by back-propagating the segmentation loss and the edge loss.

In some embodiments, a weight may be assigned to each of the segmentation loss and the edge loss, and the weights of the segmentation neural network may be updated in consideration of the assigned weights. In some examples, the weight assigned to the edge loss may be determined according to precision of the shape information included in the label. For example, the weight assigned to the edge loss in a case where the label information includes fine edge information of the semantic object may be higher than the weight assigned to the edge loss in a case where the label information includes scribble information. In another example, the weight assigned to the edge loss may be determined according to a ratio of the coarse labels among the labels given to the image set. That is, the more coarse labels are included in the image set, the higher the weight assigned the edge loss may be. As a result, when there are a lot of coarse labels, the segmentation neural network can be learned with more emphasis on the shape of the semantic object.

In step S600, it is determined whether the learning ends. Whether the learning ends may be determined based on a preset end condition. In addition, the end condition may be defined and set based on various criteria such as epoch, existence of unlearned data, and performance of neural network. Therefore, the technical scope of the present disclosure is not limited to the specific end condition.

If it is determined that the end condition is not satisfied, the above-described steps S200 to S600 may be performed again. Otherwise, the learning for the segmentation neural network may end. Once the segmentation neural network is learned, the semantic segmentation (i.e., an inference process) may be performed on the unlabeled image. The inference process will be described with reference to FIG. 9.

The learning process of the segmentation neural network has been described above with reference to FIG. 4. As described above, the segmentation neural network is learned by using the edge loss in addition to the segmentation loss. Thus, the segmentation neural network can be learned to more accurately predict the shape of the semantic object. That is, even if the coarse label containing the incorrect shape information of the semantic object is used, the segmentation information containing the exact shape information of the semantic object may be provided through the segmentation neural network. Accordingly, the labeling cost and the effort required to construct the training dataset can be greatly reduced.

Hereinafter, various embodiments of the present disclosure related to an edge loss and a learning process of a segmentation neural network are described with reference to FIG. 5 to FIG. 8.

Figure 5:
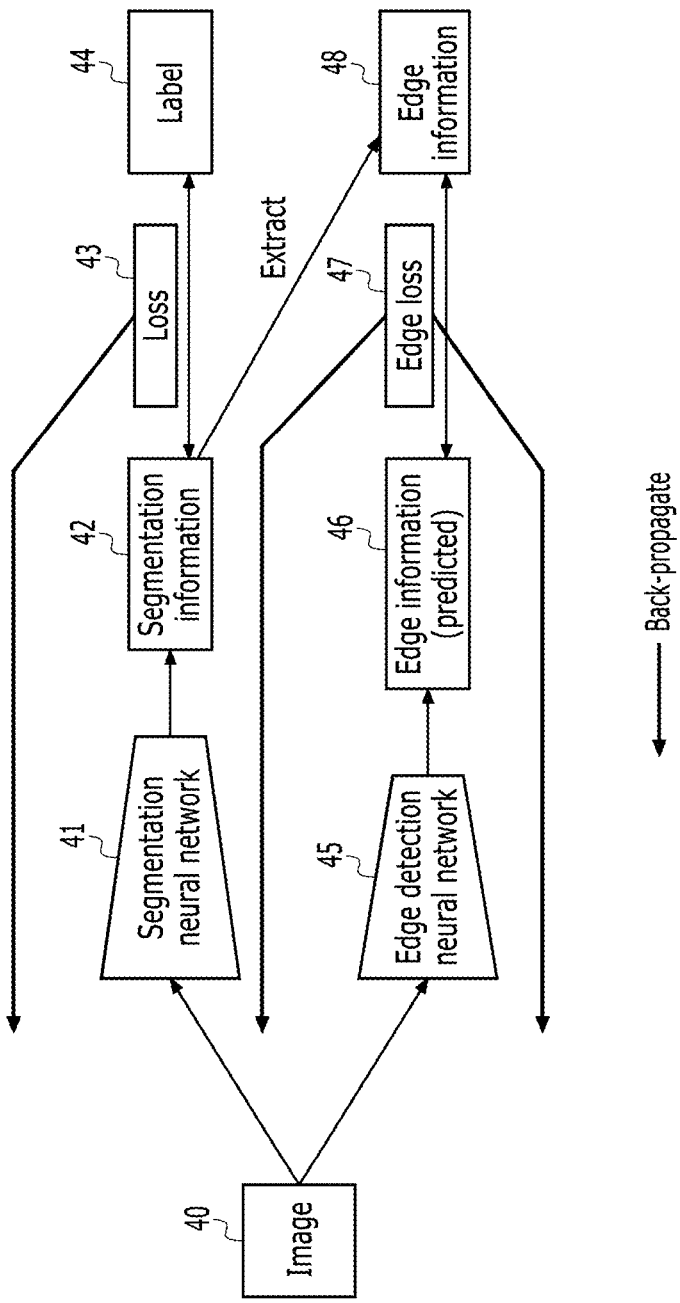
FIG. 5 is a diagram for explaining a learning process of a segmentation neural network according to a first embodiment of the present disclosure.

FIG. 5 is a diagram for explaining a learning process of a segmentation neural network according to a first embodiment of the present disclosure.

As shown in FIG. 5, in the first embodiment, an edge detection neural network 45 is used to calculate an edge loss 47. The edge detection neural network 45 is a neural network that predicts an edge associated with a semantic object in an input image 40, and may be understood as an auxiliary neural network for learning the segmentation neural network 41. Hereinafter, a specific learning process is described.

As described above, the segmentation loss 43 may be calculated based on a difference between segmentation information 42 predicted by the segmentation neural network 41 and label information 44. Further, weights of the segmentation neural network 41 may be updated through back-propagation of the segmentation loss 43.

The edge loss 47 may be calculated based on a difference between first edge information 46 predicted by the edge detection neural network 45 and second edge information 48 extracted from the segmentation information 42. Here, the second edge information 48 may be extracted by applying image processing logic to the segmentation information 42. The image processing logic may include various types of edge detection logic such as, for example, the Sobel operation. Thus, the technical scope of the present disclosure is not limited to a specific type of logic.

In some embodiments, the edge loss 47 may be calculated based on an L1 loss function or an L2 loss function. Here, the L1 loss function means least absolute deviations, and the L2 loss function means least square errors. However, since various loss functions may be applied, the technical scope of the present disclosure is not limited thereto.

As the edge loss 47 is back-propagated, the weights of the segmentation neural network 41 and the edge detection neural network 45 may be updated. In this case, since the edge loss 47 is calculated based on the segmentation information 42, the edge detection neural network 45 may be learned to detect only the edge associated with the semantic object in the input image (e.g., 40). Further, since the segmentation neural network 41 is learned to minimize the edge loss 47, the segmentation neural network 41 can more accurately predict the shape information of the semantic object.

In some embodiments, the edge detection neural network 45 may be implemented as a shallower neural network (i.e., a neural network with fewer layers) than the segmentation neural network 41, or may be implemented to have fewer weight parameters than the segmentation neural network 41. The segmentation neural network 41 is required to extract and deeply understand the high-dimensional features associated with the semantic object due to the nature of the semantic segmentation task, so the segmentation neural network 41 may be implemented as a relatively deep neural network. However, since the edge detection neural network 45 performs only an operation of extracting a local feature associated with the semantic object from the image, it is not required to have the deep understanding of the semantic object. Therefore, the edge detection neural network 45 may be implemented with a relatively shallow neural network.

Meanwhile, in some embodiments, as the learning progresses, the weights of the segmentation loss 43 and the edge loss 47 affecting the learning of the segmentation neural network 41 may vary. For example, as the learning progresses, the weight assigned to the edge loss 47 may increase, and the weight assigned to the segmentation loss 43 may decrease. This is because the accuracy of the edge loss 47 may vary according to the learning maturity of the edge detection neural network 45 and the accuracy of the edge loss 47 may increase as the edge detection neural network 45 matures.

Figure 6:
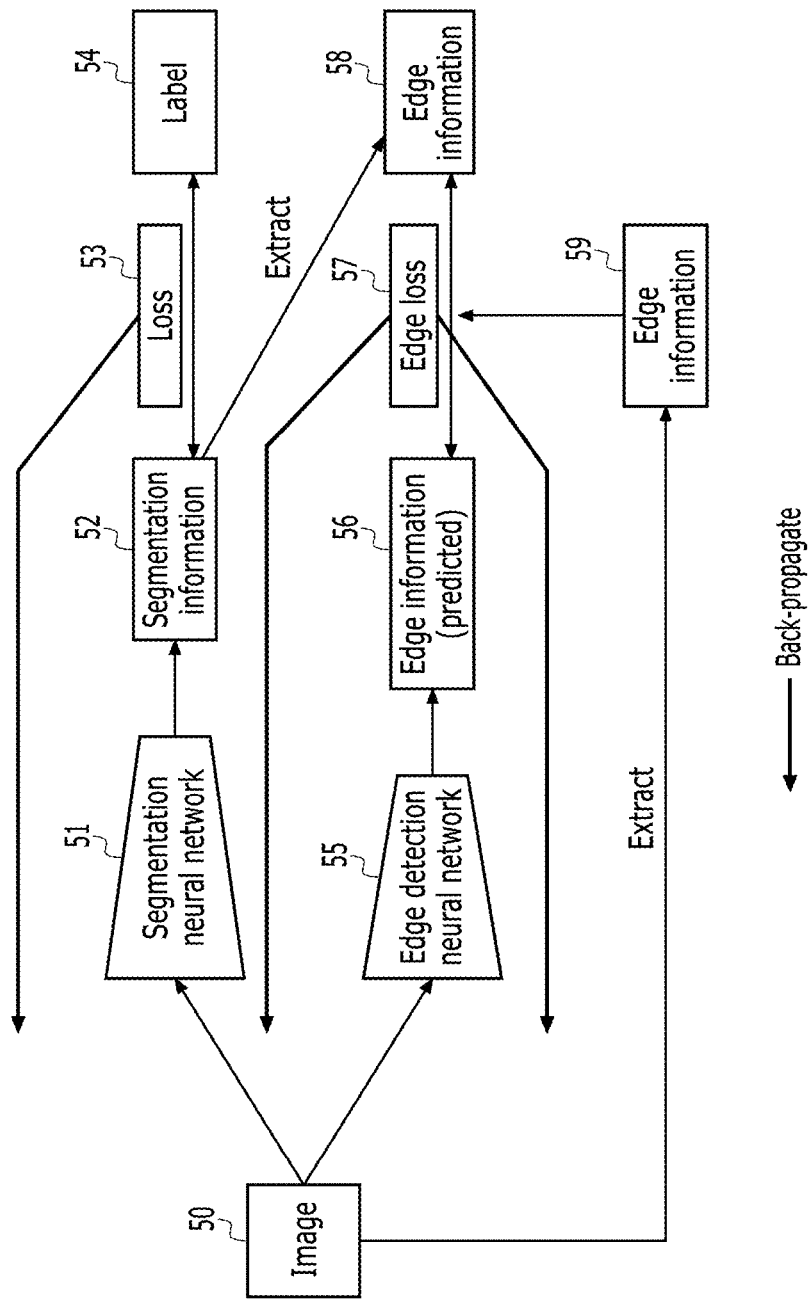
FIG. 6 is a diagram for explaining a learning process of a segmentation neural network according to a second embodiment of the present disclosure.

FIG. 6 is a diagram for explaining a learning process of a segmentation neural network according to a second embodiment of the present disclosure. In the following description, the description overlapping with the previous embodiment is omitted, and the difference from the previous embodiment is mainly described.

As shown in FIG. 6, in the second embodiment, an edge loss 57 may be calculated by using third edge information 59 extracted from an input image 50 in addition to first edge information 56 predicted by an edge detection neural network 55 and second edge information 58 extracted from segmentation information 52. In this case, an extraction process may be performed through image processing logic (e.g. edge detection logic such as the Sobel operation). A specific method of calculating the edge loss 57 may vary depending on embodiments.

In some embodiments, an edge of the semantic object included in the second edge information 58 may be corrected based on the third edge information 59. In addition, the edge loss 57 may be calculated based on a difference between the corrected edge and the first edge information 56. However, since the third edge information 59 may include a plurality of edges not associated with the semantic object, a noise removing process for the third edge information 59 may be further performed before the correction. The noise removing process may be performed in a variety of ways. In some examples, the edge not associated with the semantic object may be removed (that is, only the edge closely associated with the semantic object may be selected) from the third edge information 59 by using location information of the semantic object included in the segmentation information 52. In another example, the edge associated with the semantic object in the third edge information 59 may be corrected by using location and class information of the semantic object included in the segmentation information 52 and the previously-known shape information of the semantic object. In this case, the shape information may include various information such as an overall shape of the semantic object and a ratio of specific parts. In yet another example, the example noise removing process may also be performed for the second edge information 58. According to the present embodiment, the edge loss 57 may be more accurately calculated by using the edge information 56, 58, and 59 detected or extracted in various ways. Accordingly, the segmentation neural network 51 can be learned to more accurately predict the shape information of the semantic object.

As in the first embodiment described above, the edge loss 57 may be used to learn the segmentation neural network 51 and the edge detection neural network 55, and a segmentation loss 53 may be calculated a difference between the segmentation information 52 and label information 54.

Figure 7:
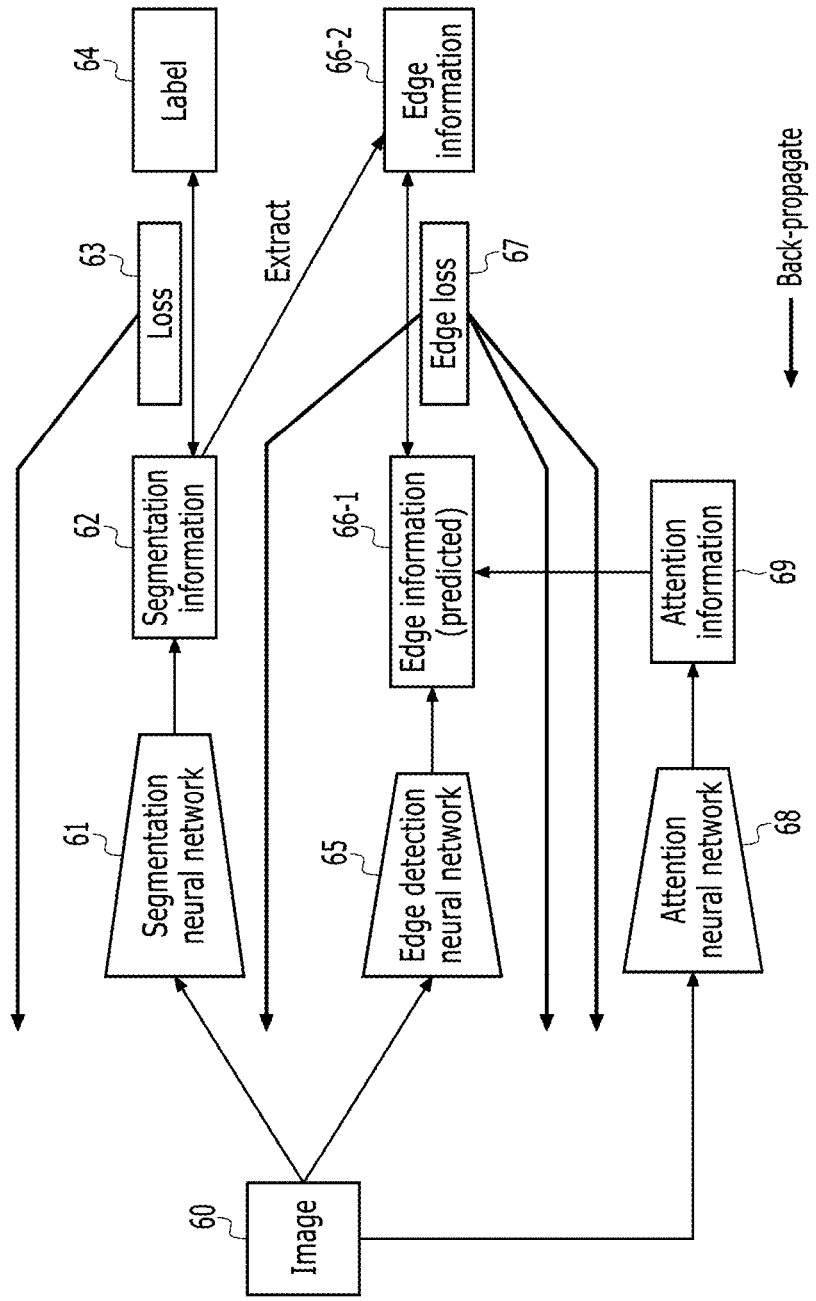
FIG. 7 is a diagram for explaining a learning process of a segmentation neural network according to a third embodiment of the present disclosure.

FIG. 7 is a diagram for explaining a learning process of a segmentation neural network according to a third embodiment of the present disclosure. In the following description, the description overlapping with the previous embodiment is omitted, and the difference from the previous embodiment is mainly described.

As shown in FIG. 7, in the third embodiment, an attention neural network 68 may be used to more accurately calculate an edge loss 67. The attention neural network 68 may mean a neural network that outputs attention information about an input image 60. The attention information may be understood as weight information used to remove noise (e.g. an edge not associated with a semantic object among predicted edges) included in first edge information 66-1. For example, the attention information may be configured as a weight for each pixel, and the noise may be removed by reflecting the weight for each pixel to the first edge information 66-1. More specifically, when the attention information is reflected in the first edge information 66-1, a value of an edge pixel associated with the semantic object is amplified and a value of an edge pixel not associated with the semantic object is suppressed so that the noise can be removed.

The attention neural network 68 may be learned based on the edge loss 67. That is, weights of the attention neural network 68, a segmentation neural network 61, and an edge detection neural network 65 may be updated through back-propagation of the edge loss 67. However, in some embodiments, the edge detection neural network 65 may be learned based on an error between the first edge information 66-1 and second edge information 66-2 (i.e., an error in which the attention information 69 is not reflected). Since the attention neural network 68 may be implemented as a neural network having various structures, the technical scope of the present disclosure is not limited by a manner in which the attention neural network 68 is implemented.

In some embodiments, the attention neural network 68 may be implemented as a deeper neural network (i.e., a neural network with more layers) than the edge detection neural network 65, or may be implemented to have more weight parameters than the edge detection neural network 65. This is because the performance of the attention neural network 68 (that is, the accuracy of the attention information) tends to improve as the neural network becomes deeper.

As in the embodiments described above, a segmentation loss 63 may be calculated based on a difference between segmentation information 62 and label information 64, and the weights of the segmentation neural network 61 may be updated by back-propagating the segmentation loss 63.

Figure 8:
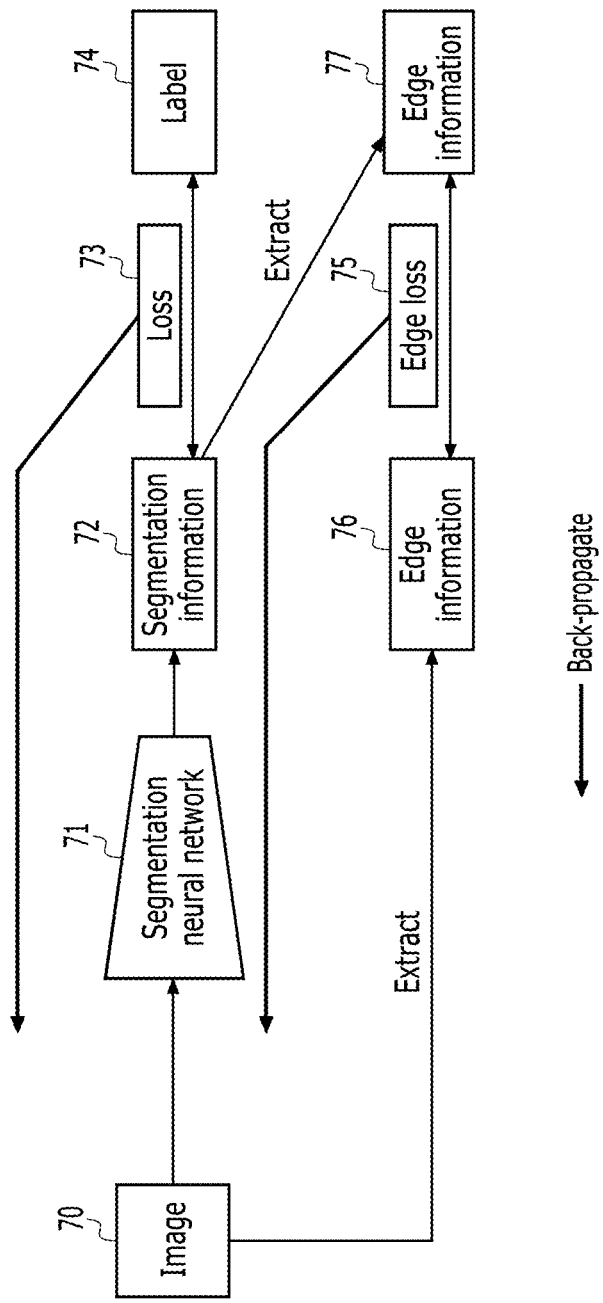
FIG. 8 is a diagram for explaining a learning process of a segmentation neural network according to a fourth embodiment of the present disclosure.

FIG. 8 is a diagram for explaining a learning process of a segmentation neural network according to a fourth embodiment of the present disclosure. In the following description, the description overlapping with the previous embodiment is omitted, and the difference from the previous embodiment is mainly described.

As shown in FIG. 8, in the fourth embodiment, no edge detection neural network may be used, and an edge loss 75 may be calculated based on first edge information 76 extracted from an input image 70 and second edge information 77 extracted from segmentation information 72. In addition, an extraction process may be performed through image processing logic.

However, the first edge information 76 may include a plurality of edges not associated with a semantic object. Accordingly, in some embodiments, a noise removing process for the first edge information 76 may be performed before the edge loss 75 is calculated.

The noise removing process may be performed in a variety of ways. In some examples, an edge not associated with the semantic object may be removed (that is, only an edge closely associated with the semantic object may be selected) from the first edge information 76 by using location information of the semantic object included in the segmentation information 72. In another example, the edge associated with the semantic object may be corrected in the first edge information 76 by using location and class information of the semantic object included in the segmentation information 72 and the previously-known shape information of the semantic object. In this case, the shape information may include various information such as an overall shape of the semantic object and a ratio of specific parts.

In some embodiments, the example noise removing process may also be performed for the second edge information 77.

As in the embodiments described above, a segmentation loss 73 may be calculated based on a difference between the segmentation information 72 and label information 74, and the weights of the segmentation neural network 71 may be updated by back-propagating the segmentation loss 73.

According to the fourth embodiment, an auxiliary neural network for edge detection does not need to be learned. Thus, the computing cost for learning can be reduced.

The learning process of the segmentation neural network according to various embodiments of the present disclosure has been described above with reference to FIG. 5 to FIG. 8. As described above, the edge loss may be calculated in various ways, and the segmentation neural network may be further learned based on the edge loss. As a result, the segmentation neural network can be constructed that can perform fine prediction on the shape information of the semantic object even when the coarse label is given. Further, the labeling cost can be greatly reduced so that the neural network for semantic segmentation tasks can be constructed in various domains (e.g., medical domains).

Hereinafter, an inference process of a semantic segmentation method according to some embodiments of the present disclosure is described with reference to FIG. 9.

Figure 9:
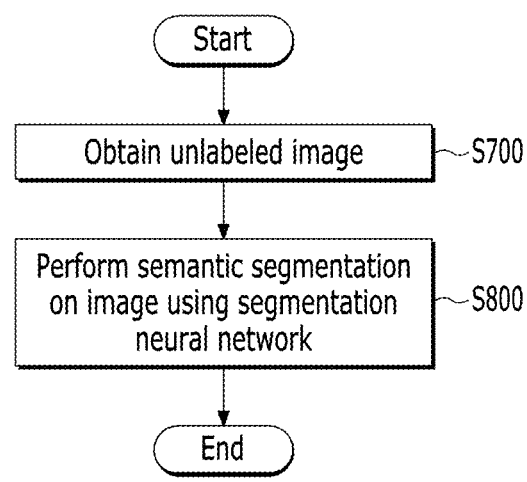
FIG. 9 is an example flowchart schematically showing an inference process of a semantic segmentation method according to some embodiments of the present disclosure.

FIG. 9 is an example flowchart showing an inference process. However, the flowchart shown in FIG. 9 merely corresponds to an exemplary embodiment for achieving an object of the present disclosure, and some steps may be added or omitted as necessary.

As shown in FIG. 9, the inference process is performed on an image that is not given a label (S700), and may be performed by inputting the image into a previously learned segmentation neural network (S800). In addition, segmentation information may be output through the segmentation neural network. For example, as shown in FIG. 1, an image 17 in which a semantic object is segmented or a segmentation map 15 including pixel-wise class information of the semantic object may be output.

In some embodiments, a correction process may be further performed to improve the accuracy of a segmentation result by using edge information of an edge detection neural network (e.g., 45, 55, or 65 of FIG. 4 to FIG. 7). For example, the accuracy of the segmentation result may be further improved by correcting the segmentation information based on the edge information obtained from the edge detection neural network.

The inference process of the semantic segmentation method according to some embodiments of the present disclosure has been described above with reference to FIG. 9. Hereinafter, an example computing device 100 for implementing an apparatus (e.g., segmentation apparatus 10 of FIG. 1) according to various embodiments of the present disclosure is described with reference to FIG. 10.

FIG. 10 is a hardware diagram showing a computing device 100.

As shown in FIG. 10, a computing device 100 may include one or more processors 110, a bus 150, a communication interface 170, a memory 130 to which a computer program 191 to be executed by the processor 110 is loaded, and a storage 190 which stores the computer program 191. However, FIG. 10 shows only elements related to embodiments of the present disclosure. Therefore, the person of ordinary skill in the art will understand that general elements other than those shown in FIG. 10 may be further included.

The processor 110 controls overall operation of each element of the computing device 100. The processor 110 may be configured to include at least one of a central processing unit (CPU), a microprocessor unit (MPU), a microcontroller unit (MCU), a graphics processing unit (GPU), and any form of processor well known in the technical field of the present disclosure. The processor 110 may perform calculation of at least one application or program for executing methods or operations according to embodiments of the present disclosure.

The memory 130 stores various kinds of data, commands, and/or information. To execute methods or operations according to various embodiments of the present disclosure, the memory 130 may load one or more programs 191 from the storage 190. The memory 130 may be implemented as a volatile memory such as a random access memory (RAM), but the technical scope of the present disclosure is not limited thereto.

The bus 150 provides a communication function between elements of the computing device 100. The bus 150 may be implemented as various forms of buses, such as an address bus, a data bus, and a control bus.

The communication interface 170 supports wired or wireless Internet communication of the computing device 100. Further, the communication interface 170 may support various communication methods as well as Internet communication. To this end, the communication interface 170 may include a communication module well known in the technical field of the present disclosure. In some embodiments, the communication interface 170 may be omitted.

The storage 190 may non-temporarily store the one or more programs 191. The storage 190 may include a non-volatile memory, such as a read only memory (ROM), an erasable programmable ROM (EPROM), an electrically erasable programmable ROM (EEPROM), and a flash memory, a hard disk, a removable disk, or any form of computer-readable recording medium well known in the art to which the present disclosure pertains.

The computer program 191 may include one or more instructions which cause the processor 110 to perform methods or operations according to various embodiments of the present disclosure when loaded to the memory 130. In other words, the processor 110 may execute methods or operations according to various embodiments of the present disclosure by performing the one or more instructions.

For example, the computer program 191 may include instructions to perform an operation of inputting a labeled image to a segmentation neural network to obtain segmentation information for the image, calculating a segmentation loss and an edge loss for the segmentation information, and back-propagating the calculated edge loss to update the segmentation neural network. In this case, the segmentation apparatus 10 according to some embodiments of the present disclosure may be implemented through the computing device 100.

Various embodiments of the present disclosure and effects thereof have been described above with reference to FIG. 1 to FIG. 10. The effects of the present disclosure are not limited to those described above, and other effects which have not been described can be clearly understood by the person of ordinary skill in the art from the following description.

The technical concepts of the disclosure described above with reference to FIG. 1 to FIG. 10 may be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing device via a network such as the Internet and installed in another computing device, so that the computer program can be used in another computing device.

The technical concept of the present disclosure is not necessarily limited to these embodiments, as all the elements configuring the embodiments of the present disclosure have been described as being combined or operated in combination. That is, within the scope of the present disclosure, all of the elements may be selectively operable in combination with one or more.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to embodiments thereof, it will be understood by the person of ordinary skill in the art that various changes in form and detail may be made therein without departing from the spirit and scope of the present disclosure as defined by the following claims. The embodiments should be considered in a descriptive sense only and not for purposes of limitation.

What is claimed is:

1. A semantic segmentation method performed by a computing device, comprising:
    obtaining, from an image given a label for an semantic object, segmentation information for the image through a segmentation neural network;
    calculating a segmentation loss based on a difference between the segmentation information and the label;
    obtaining first edge information of the semantic object from the image and obtaining second edge information from the segmentation information;
    calculating an edge loss for the semantic object based on a difference between the first edge information and the second edge information; and
    back-propagating the segmentation loss and the edge loss to update the segmentation neural network,
    wherein the label includes no edge information indicating a shape of the semantic object.

2. The semantic segmentation method of claim 1, wherein the label includes marking information indicating a location of the semantic object or scrabble information of the semantic object.

3. The semantic segmentation method of claim 1, wherein the segmentation loss is calculated based on a cross-entropy loss function, and
    wherein the edge loss is calculated based on an L1 loss function or an L2 loss function.

4. The semantic segmentation method of claim 1, wherein obtaining the first edge information of the semantic object from the image and obtaining the second edge information from the segmentation information comprises:
    obtaining the first edge information of the semantic object in the image through an edge detection neural network; and
    obtaining the second edge information from the segmentation information using image processing logic,
    wherein the semantic segmentation method further comprises back-propagating the edge loss to update the edge detection neural network.

5. The semantic segmentation method of claim 4, wherein the edge detection neural network comprises fewer layers or weight parameters than the segmentation neural network.

6. The semantic segmentation method of claim 4, wherein calculating the edge loss for the semantic object based on the difference between the first edge information and the second edge information comprises:
    obtaining attention information of the image through an attention neural network;
    obtaining third edge information by applying the attention information to the first edge information; and
    calculating the edge loss based on the difference between the second edge information and the third edge information,
    wherein the semantic segmentation method further comprises back-propagating the edge loss calculated based on the difference between the second edge information and the third edge information to update the attention neural network.

7. The semantic segmentation method of claim 6, wherein the attention neural network comprises more layers or weight parameters than the edge detection neural network.

8. A semantic segmentation apparatus comprising:
    a memory that stores one or more instructions; and
    a processor that, by executing the one or more instructions,
        obtains, from an image given a label for an semantic object, segmentation information for the image through a segmentation neural network,
        calculates a segmentation loss and based on a difference between the segmentation information and the label,
        obtains first edge information of the semantic object from the image and obtains second edge information from the segmentation information,
        calculates an edge loss for the semantic object based on a difference between the first edge information and the second edge information, and back-propagates the segmentation loss and the edge loss to update the segmentation neural network, wherein the label includes no edge information indicating a shape of the semantic object.

9. The semantic segmentation apparatus of claim 8, wherein the segmentation loss is calculated based on a cross-entropy loss function, and the edge loss is calculated based on an L1 loss function or an L2 loss function.

10. The semantic segmentation apparatus of claim 8, wherein the processor, when obtaining the first edge information of the semantic object from the image and obtaining the second edge information from the segmentation information:

obtains the first edge information of the semantic object in the image through an edge detection neural network;

obtains the second edge information from the segmentation information using image processing logic; and back-propagates the edge loss to update the edge detection neural network.

11. The semantic segmentation apparatus of claim 10, wherein the edge detection neural network comprises fewer layers or weight parameters than the segmentation neural network.

12. The semantic segmentation apparatus of claim 10, wherein the processor, when calculating the edge loss for the semantic object based on the difference between the first edge information and the second edge information:

obtains attention information of the image through an attention neural network;

generates third edge information by applying the attention information to the first edge information;

calculates the edge loss based on the difference between the second edge information and the third edge information; and back-propagates the edge loss calculated based on the difference between the second edge information and the third edge information to update the attention neural network.

13. The semantic segmentation apparatus of claim 12, wherein the attention neural network comprises more layers or weight parameters than the edge detection neural network.

14. The semantic segmentation apparatus of claim 10, wherein the processor, by executing the one or more instructions:

obtaining third edge information of the semantic object in the image through an edge detection neural network, wherein the processor, when calculating the edge loss for the semantic object based on the difference between the first edge information and the second edge information:

corrects the second edge information based on the third edge information; and calculates the edge loss based on a difference between the first edge information and the corrected second edge information.

15. A computer program stored in a non-transitory computer-readable recording medium, for causing a computing device to execute:

obtaining, from an image given a label for an semantic object, segmentation information for the image through a segmentation neural network;

calculating a segmentation loss based on a difference between the segmentation information and the label;

obtaining first edge information of the semantic object from the image and obtaining second edge information from the segmentation information;

calculating an edge loss for the semantic object based on a difference between the first edge information and the second edge information and back-propagating the segmentation loss and the edge loss to update the segmentation neural network, wherein the label includes no edge information indicating a shape of the semantic object.

16. The computer program of claim 15, wherein the segmentation loss is calculated based on a cross-entropy loss function, and wherein the edge loss is calculated based on an L1 loss function or an L2 loss function.

17. The computer program of claim 15, wherein obtaining the first edge information of the semantic object from the image and obtaining the second edge information from the segmentation information comprises:

obtaining the first edge information of the semantic object in the image through an edge detection neural network; and obtaining the second edge information from the segmentation information using image processing logic, wherein the edge detection neural network is updated by back-propagating the edge loss.

* * * * *